(12) United States Patent
Iwasaki

(10) Patent No.: US 8,976,289 B2
(45) Date of Patent: Mar. 10, 2015

(54) IMAGING DEVICE

(71) Applicant: FUJIFILM Corporation, Minato-ku, Tokyo (JP)

(72) Inventor: Yoichi Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 179 days.

(21) Appl. No.: 13/661,936

(22) Filed: Oct. 26, 2012

(65) Prior Publication Data

US 2013/0100338 A1    Apr. 25, 2013

Related U.S. Application Data

(63) Continuation of application No. PCT/JP2011/059257, filed on Apr. 14, 2011.

(30) Foreign Application Priority Data

Apr. 28, 2010  (JP) .................................. 2010-103903

(51) Int. Cl.
*H04N 5/232*  (2006.01)
*G03B 3/10*  (2006.01)
*G03B 13/36*  (2006.01)

(52) U.S. Cl.
CPC .............. *H04N 5/23212* (2013.01); *G03B 3/10* (2013.01); *G03B 13/36* (2013.01)
USPC ........................................................ 348/350

(58) Field of Classification Search
USPC .................... 348/345, 349, 350, 362–366
See application file for complete search history.

(56) References Cited

U.S. PATENT DOCUMENTS

| 2003/0169355 | A1  | 9/2003 | Kubo |
| 2011/0013061 | A1* | 1/2011 | Hoda et al. ................... 348/294 |
| 2011/0063484 | A1  | 3/2011 | Fujii et al. |
| 2012/0133813 | A1* | 5/2012 | Nagano ......................... 348/311 |
| 2013/0088621 | A1* | 4/2013 | Hamada ........................ 348/281 |
| 2013/0201383 | A1* | 8/2013 | Okado .......................... 348/345 |
| 2014/0022446 | A1* | 1/2014 | Endo et al. ..................... 348/353 |
| 2014/0092220 | A1* | 4/2014 | Kawamura et al. ............. 348/49 |

FOREIGN PATENT DOCUMENTS

| JP | 03-179309 A   | 8/1991 |
| JP | 2002-258142 A | 9/2002 |

(Continued)

OTHER PUBLICATIONS

Notification of First Office Action, dated Jun. 12, 2014, issued in corresponding CN Application No. 201180021604.9, 16 pages in English and Chinese.

*Primary Examiner* — Timothy J Henn
(74) *Attorney, Agent, or Firm* — Sughrue Mion, PLLC

(57) ABSTRACT

An imaging device of an aspect of the invention, when reading, as voltage signals, signal charges output from a first pixel receiving a light on a partial area biased to a predetermined direction from a light axis of a light flux passing an exit pupil of an imaging optical system and a second pixel arranged so as to be adjacent to the first pixel and receiving a light on a partial area biased to an opposite direction to the predetermined direction from the light axis, combines and reads the signal charges of adjacent first-number pixels with respect to the first pixel and the second pixel, and calculates an arithmetic mean of adjacent second-number voltage signals with respect to the combined and read voltage signals of the first pixel and the second pixel.

14 Claims, 11 Drawing Sheets

(56) References Cited

FOREIGN PATENT DOCUMENTS

| | | |
|---|---|---|
| JP | 2003-264844 A | 9/2003 |
| JP | 2005-303409 A | 10/2005 |
| JP | 2006-208802 A | 8/2006 |
| JP | 2006-324760 A | 11/2006 |
| JP | 2008-015754 A | 1/2008 |
| JP | 2009-008686 A | 1/2009 |
| JP | 2009-204987 A | 9/2009 |

* cited by examiner

PRIMARY PIXEL

SECONDARY PIXEL

IMAGING DEVICE

CROSS-REFERENCE TO RELATED APPLICATIONS

This application is a PCT Bypass continuation application and claims the priority benefit under 35 U.S.C. §120 of PCT Application No. PCT/JP2011/059257 filed on Apr. 14, 2011 which application designates the U.S., and also claims the priority benefit under 35 U.S.C. §119 of Japanese Patent Application No. 2010-103903 filed on Apr. 28, 2010, which applications are all hereby incorporated in their entireties by reference.

BACKGROUND OF THE INVENTION

1. Field of the Invention

The present invention relates to an imaging device and especially relates to a technique of performing automatic focus adjustment using a phase difference detection scheme.

2. Description of the Related Art

Japanese Patent Application Laid-Open No. 2002-258142 discloses an imaging device that performs focus detection in a phase difference detection scheme, performs pixel combination of four adjacent right, left, up and down pixels in the case of low brightness to output them and performs focusing using this output signal.

Japanese Patent Application Laid-Open No. 2006-324760 discloses an imaging device that performs pixel combination by performing adjustment of larger pixel numbers in the case of lower brightness and performs contrast AF based on a light receiving signal after the pixel combination.

SUMMARY OF INVENTION

However, in the invention disclosed in Japanese Patent Application Laid-Open No. 2002-258142, pixels in the right and left directions are subjected to pixel combination in the case of lower brightness, and therefore there is a problem that the accuracy of AF processing degrades. Also, no processing applies to the signal of each pixel in the case of higher brightness, and therefore there is a problem that it is not possible to reduce noise.

Also, in the invention disclosed in Japanese Patent Application Laid-Open No. 2006-324760, because of a contrast AF scheme, there is a problem that it takes a long time to perform AF processing in the phase detection scheme.

The present invention is made in view of the above, and it is an object to provide an imaging device that can shorten a time required for AF processing and perform an accurate focus adjustment at lower cost and with space-saving.

The imaging device of a first aspect of the present invention includes: an imaging optical system; an imaging element in which a first pixel and a second pixel are arranged in a two-dimensional manner, the first pixel receiving a light on a partial area biased to a predetermined direction from a light axis of a light flux passing an exit pupil of the imaging optical system, and the second pixel arranged so as to be adjacent to the first pixel and receiving a light on a partial area biased to an opposite direction to the predetermined direction from the light axis of the light flux passing the exit pupil of the imaging optical system; an imaging element drive unit configured to read signal charges output from the first pixel and the second pixel as a voltage signal, the imaging element drive unit configured to read and combine signal charges of a first number of adjacent pixels with respect to the first pixel and the second pixel; an arithmetic mean calculation unit configured to calculate an arithmetic mean of a second number of adjacent voltage signals with respect to voltage signals of the first pixel and the second pixel combined and read by the imaging element drive unit; and an automatic focus adjustment unit configured to detect a phase difference between a voltage signal of the first pixel and a voltage signal of the second pixel subjected to arithmetic mean in the arithmetic mean calculation unit, and to automatically perform a focus adjustment of the imaging optical system based on the phase difference.

According to the imaging device of the first aspect, when reading, as voltage signals, the signal charges output from the first pixel receiving the light on the partial area biased to the predetermined direction from the light axis of the light flux passing the exit pupil of the imaging optical system and the second pixel arranged so as to be adjacent to the first pixel and receiving the light on the partial area biased to the opposite direction to the predetermined direction from the light axis of the light flux passing the exit pupil of the imaging optical system, the signal charges of adjacent first-number pixels are combined and read with respect to the first pixel and the second pixel. The arithmetic mean of adjacent second-number voltage signals are calculated with respect to the combined and read voltage signals of the first pixel and the second pixel. Subsequently, a phase difference is detected between the voltage signal of the first pixel and the voltage signal of the second pixel subjected to arithmetic mean, and a focus adjustment of the imaging optical system is automatically performed based on this phase difference. By this means, by using both the pixel combination and the arithmetic mean, it is possible to reduce noise regardless of the subject brightness and improve the SN ratio. Therefore, it is possible to perform an accurate automatic focus adjustment.

Further, since the automatic focus adjustment (AF) is performed using the imaging element in which phase difference pixels formed with the first pixel and the second pixel are arranged, it is possible to shorten the time required for AF processing. Since this imaging element is similar to an imaging element used for conventional phase difference AF and new hardware is not required to implement the present invention, it is possible to perform an accurate focus adjustment at lower cost and with space-saving.

The imaging device of a second aspect of the present invention is configured such that, in the first aspect, the arithmetic mean calculation unit determines the first number and the second number such that a product of the first number and the second number is constant.

According to the imaging device of the second aspect, the first number and the second number are determined such that the product of the first number and the second number is constant, and therefore it is possible to maintain the size of an area in which a phase difference and a defocus amount are calculated, regardless of the subject brightness. Therefore, a stable automatic focus adjustment is possible.

The imaging device of a third aspect of the present invention is configured such that, in the first or second aspect, the imaging element drive unit combines the first number of signal charges adjacent in a vertical direction, and the arithmetic mean calculation unit calculates an arithmetic mean of the second number of voltage signals adjacent in a vertical direction.

According to the imaging device of the third aspect, the first-number pixels adjacent in the vertical direction are subjected to pixel combination. Also, the arithmetic mean is calculated for the second-numbers adjacent in the vertical direction, with respect to the read voltage signals subjected to pixel combination. Also, a phase difference is detected between the voltage signal of the first pixel and the voltage signal of the second pixel subjected to arithmetic mean, and a focus adjustment of the imaging optical system is automatically performed based on this phase difference. That is, the pixel combination and the arithmetic mean are performed only in the vertical direction, and none of the pixel combination and the arithmetic mean is performed in the horizontal direction. By this means, it is possible to reduce noise without degrading the accuracy of AF processing. Therefore, it is possible to perform an automatic focus adjustment more stably.

The imaging device of a fourth aspect of the present invention includes, in one of the first to third aspects, a brightness acquisition unit configured to acquire a brightness of a subject, wherein the imaging element drive unit sets the first number to 1 when the acquired brightness of the subject is equal to or greater than a predetermined brightness, and increases the first number as the measured brightness of the subject becomes lower.

According to the imaging device of the fourth aspect, the first number is set to 1 when the brightness of the subject is equal to or greater than the predetermined brightness, and the pixel combination is not performed. Also, the first number is increased as the brightness of the subject becomes lower, and the combined pixel number (pixel combination number) is increased. By this means, even if the brightness is low, it is possible to adequately reduce noise and improve the SN ratio. Therefore, even in a darker brightness area, an automatic focus adjustment is possible.

The imaging device of a fifth aspect of the present invention includes, in the fourth aspect, an area division unit configured to divide the imaging element into a plurality of areas when the acquired brightness of the subject is higher than a predetermined threshold, wherein: the arithmetic mean calculation unit calculates an arithmetic mean of the voltage signals for each of the divided areas; and the automatic focus adjustment unit detects a phase difference between the first-pixel voltage signal and the second-pixel voltage signal for each of the areas based on the calculated arithmetic mean of the voltage signals for each of the areas, and automatically performs a focus adjustment of the imaging optical system based on the most reliable phase difference among the phase differences detected in the areas.

According to the imaging device of the fifth aspect, when the brightness of the subject is higher than the predetermined threshold, the imaging element is divided into a plurality of areas, and the arithmetic mean of voltage signals is calculated for each of the divided areas. Based on the calculated arithmetic mean of electric signals for each of the areas, the phase difference between the first-pixel voltage signal and the second-pixel voltage signal is detected for each of the areas, and an automatic focus adjustment is performed based on the most reliable phase difference among the phase differences detected in these areas. By this means, it is possible to perform an automatic focus adjustment more accurately.

The imaging device of a sixth aspect of the present invention is configured such that, in the fourth or fifth aspect, the arithmetic mean calculation unit sets the second number to 2 when the measured brightness of the subject is equal to or greater than a predetermined brightness, and increases the second number as the measured brightness of the subject becomes lower.

According to the imaging device of the sixth aspect, the second number is set to 2 when the brightness of the subject is equal to or greater than the predetermined brightness, that is, an arithmetic mean of two voltage signals is calculated. Also, the second number is increased as the measured brightness of the subject becomes lower, and the number of voltage signals used to calculate the arithmetic mean is increased. By this means, it is possible to perform an accurate automatic focus adjustment in a darker brightness area.

According to the present invention, it is possible to shorten a time required for AF processing and perform an accurate focus adjustment at lower cost and with space-saving.

DETAILED DESCRIPTION OF EMBODIMENTS

In the following, embodiments of a monocular stereoscopic imaging device according to the present invention will be explained with reference to the accompanying drawings.

Figure 1:
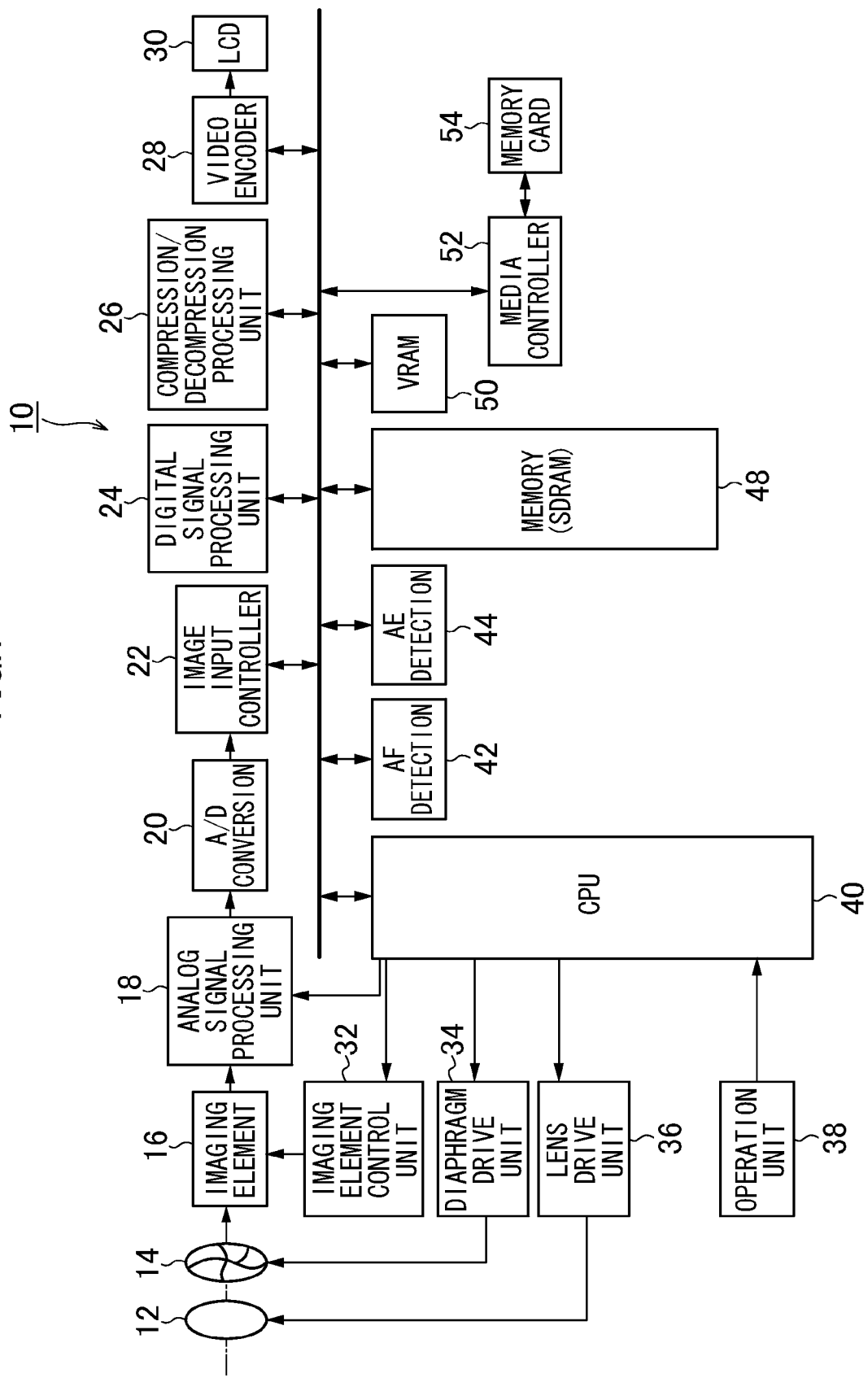
FIG. 1 is a block diagram illustrating an internal configuration of a digital camera 10 according to the first embodiment of the present invention.

FIG. 1 is a block diagram illustrating an embodiment of a digital camera to which an imaging device according to the first embodiment of the present invention is applied.

This digital camera 10 records an imaged image in a memory card 54 and the entire operation of the camera is integrally controlled by a CPU (Central Processing Unit) 40.

The digital camera 10 is provided with an operation unit 38 including a shutter button, and a mode dial to set an imaging mode, playback mode, and so on. A signal based on an operation using this operation unit 38 is input in the CPU 40.

The image light indicating a subject is formed on a light receiving surface of an imaging element 16 such as a CCD (Charge-Coupled Device) image sensor and a CMOS (Complementary Metal-Oxide Semiconductor) image sensor, via an imaging lens 12 and a diaphragm 14. The imaging lens 12 is driven by a lens drive unit 36 controlled by the CPU 40 to perform focus control or the like. The diaphragm 14 is formed with, for example, five diaphragm blades, driven by a diaphragm drive unit 34 controlled by the CPU 40 and diaphragm-controlled in five levels at 1 AV intervals in aperture values of F2.8 to F11, for example.

Also, the CPU 40 controls the diaphragm 14 via the diaphragm drive unit 34, controls charge accumulation time (i.e. shutter speed) in the imaging element 16 via an imaging element control unit 32 and controls a pixel combination described later.

Figure 2A:
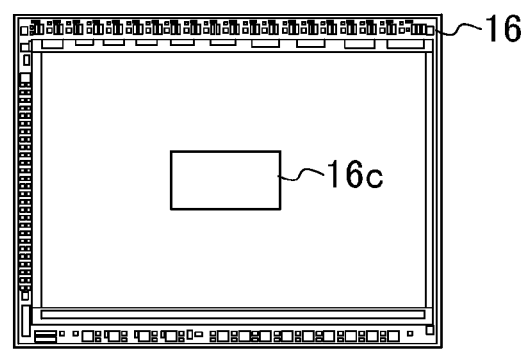
FIG. 2A is a plan view illustrating a configuration example of an imaging element.
Figure 2B:
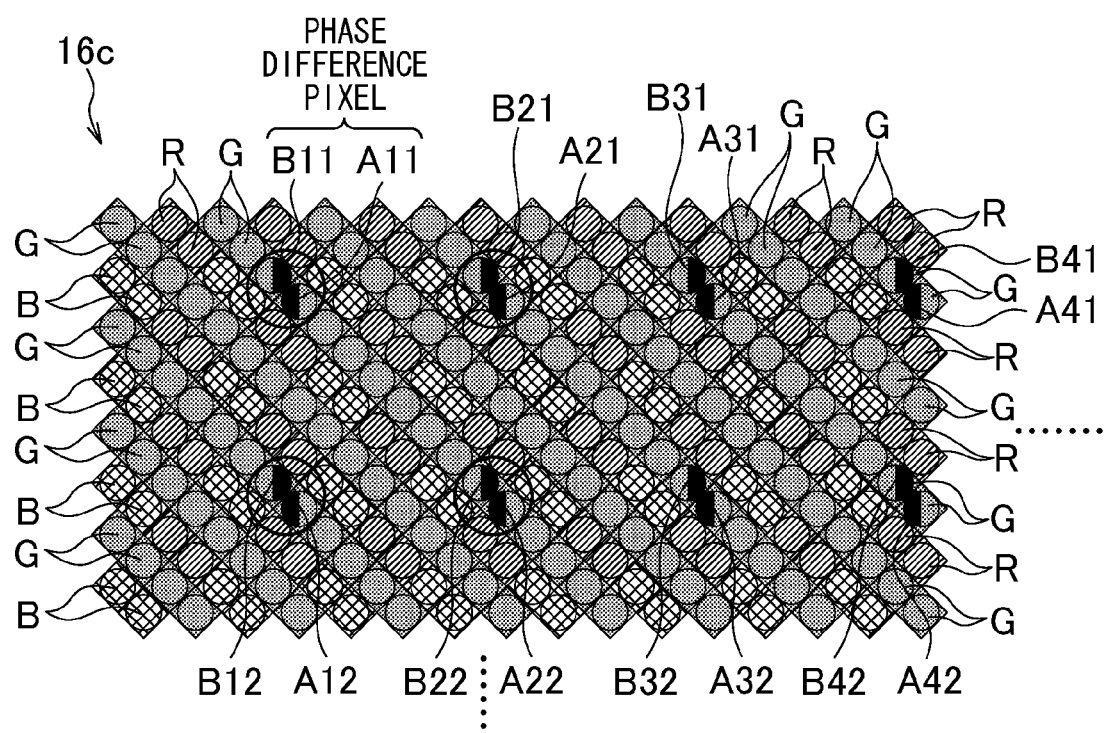
FIG. 2B is a plan view enlarging and illustrating the imaging element in FIG. 2A.

FIG. 2A is a view illustrating a configuration example of the imaging element 16, and FIG. 2B is a view enlarging and illustrating a part (central area 16C) of FIG. 2A. The imaging element 16 has odd-numbered line pixels and even-numbered line pixels arranged in a matrix manner, and the odd-numbered line pixels are arranged and shifted by a half pitch in the line direction with respect to the even-numbered line pixels.

In the imaging element 16, among pixels having color filters of R (Red), G (Green) and B (Blue), a pixel alignment line of GBGB . . . and a pixel alignment line of RGRG . . . are provided every two lines. In the enlarged view in FIG. 2, the pixel alignment line of GBGB . . . is provided in the first, second, fifth, sixth, ninth, tenth, thirteenth, fourteenth, seventeenth, eighteenth, twenty-first, twenty-second, . . . columns, and the pixel alignment line of RGRG . . . is provided in the third, fourth, seventh, eighth, eleventh, twelfth, fifteenth, sixteenth, nineteenth, twentieth . . . columns. Here, the color filter alignment is not limited to this, and it is possible to adopt honeycomb alignment in which the pixel alignment line of GBGB . . . and the pixel alignment line of RGRG . . . are alternately arranged, Bayer alignment or other alignments.

As illustrated in FIG. 2B, in the central area (focus area) 16C of the imaging element 16, phase different pixels using an output signal as an AF pixel signal for phase difference computation are arranged in addition to normal pixels not having a pupil division function. The phase difference pixels are arranged only in G pixels and formed with pixels subjected to light in a partial area biased to a predetermined direction from the light axis of the light flux passing an exit pupil of the imaging lens 12 and pixels subjected to light in a partial area biased to an opposite direction to the predetermined direction from the light axis of the light flux passing the exit pupil of the imaging lens 12. In the present embodiment, the phase difference pixels include left shift pixels B11, B12, . . . , whose right half is covered and which are subjected to light only on the left side of the light axis of the light flux passing an exit pupil, and right shift pixels A11, A12, . . . , whose left half is covered and which are subjected to light only on the right side of the light axis of the light flux passing the exit pupil.

The right shift pixels A11, A12, . . . and the left shift pixels B11, B12, . . . , are arranged in an adjacent manner, and the right shift pixels A11, A12, . . . and the left shift pixels B11, B12, . . . , are arranged every four pixels in the horizontal direction and the vertical direction. In the present embodiment, it is assumed that the upper-left-most right shift pixel and the upper-left-most left shift pixel are A11 and B11, respectively, the right shift pixel adjacent to the right shift pixel A11 in the down direction is A12 and the left shift pixel adjacent to the left shift pixel B11 in the down direction is B12. Also, it is assumed that the right shift pixel adjacent to the right shift pixel A11 in the right direction is A21 and the left shift pixel adjacent to the left shift pixel B11 in the right direction is B21.

In the present embodiment, although the central area 16C of the imaging element 16 is used as a focus area and a phase difference pixel is arranged in this focus area, the phase difference pixel may be arranged in a focus area and the focus area is not limited to the central area of the imaging element 16. The whole surface of the imaging element 16 may be used as the focus area or nine areas of three areas in the vertical direction×three areas in the horizontal direction in total may be used as the focus area.

In the present embodiment, the imaging element 16 in which phase difference pixels are arranged is used, where the phase difference pixels include left shift pixels which are subjected to light only on the left side of the light axis of the light flux passing an exit pupil and right shift pixels whose left half is covered and which are subjected to light only on the right side of the light axis of the light flux passing the exit pupil, but the phase difference pixel form is not limited to this. For example, phase difference pixels may be arranged, which are formed with pixels subjected to light only on the upper side of the light axis of the light flux passing the exit pupil and pixels subjected to light only on the lower side of the light axis of the light flux passing the exit pupil. Also, phase difference pixels may be arranged, which are formed with a partial area on the left side of the light axis of the light flux passing the exit pupil and a partial area on the right side of the light axis of the light flux passing the exit pupil (here, it is desirable that these areas are line-symmetric).

An explanation of FIG. 1 is given again. A signal charge accumulated in the imaging element 16 is read as a voltage signal according to the signal charge, based on a reading signal added from the imaging element control unit 32. The voltage signal read from the imaging element 16 is added to an analog signal processing unit 18, subjected to the sampling hold of R, G and B signals every pixel here, and amplified and added to an A/D converter 20. The A/D converter 20 converts the R, G and B signals input in order, into digital R, G and B signals and outputs them to an image input controller 22.

A digital signal processing unit 24 performs predetermined signal processing such as offset processing, white balance correction, gain control processing including sensitivity correction, gamma correction processing and YC processing on the digital image signals input via the image input controller 22.

The image data processed by the digital signal processing unit 24 is input in a VRAM (Video Random Access Memory) 50. The VRAM 50 includes an A area and B area to store image data representing an image of one frame. In the VRAM 50, image data representing an image of one frame is alternately overwritten between the A area and the B area. In the A area and B area of the VRAM 50, written image data is read from an area different from an area in which image data is being rewritten. The image data read from the VRAM 50 is encoded in a video encoder 28 and output to a liquid crystal monitor 30 provided on the rear surface of the camera. By this means, the subject is displayed on a display screen of the liquid crystal monitor 30.

Also, when a shutter button of the operation unit 38 is pressed at the first stage (half-pressed), an AE (Automatic Exposure) operation and an AF operation start. That is, the image data output from the A/D converter 20 is imported in an AF (Automatic Focus) detection unit 42 and AE detection unit 44.

The AF detection unit 42 acquires voltage signals output from the right shift pixel and the left shift pixel, performs a correlation computation and detects a phase difference. Subsequently, the AF detection unit 42 calculates a defocus amount from the phase difference and outputs this defocus amount to the CPU 40. The image signal acquired in the AF detection unit 42 is subjected to pixel combination and arithmetic mean if necessary. The pixel combination and arithmetic mean will be described later in detail.

The AE detection unit 44 integrates G signals on the whole screen or integrates G signals weighted in a different way between the screen central part and the peripheral part, and outputs the integration value to the CPU 40.

The CPU 40 calculates a shift amount of the focus lens of the imaging lens 12 based on the defocus amount input from the AF detection unit 42, and shifts the imaging lens 12 by the calculated shift amount via the lens drive unit 36. Also, the CPU 40 calculates the brightness (imaging Ev value) of the subject by the integration value input from the AE detection unit 44, and, based on this imaging Ev value, determines an aperture value of the diaphragm 14 and an electric shutter (shutter speed) of the imaging element 16 according to a predetermined program line figure. The CPU 40 controls the diaphragm 14 via the diaphragm drive unit 34 based on the determined aperture value and controls an electric accumulation time in the imaging element 16 via the imaging element control unit 32 based on the determined shutter speed.

When the AE operation and the AF operation end and the shutter button is pressed at the second stage (full-pressed), in response to the press, image data of one frame output from the A/D converter 20 is input from the image input controller 22 to a memory (SDRAM: Synchronous Dynamic Random Access Memory) 48 and temporarily stored.

The image data is read from the memory 48 and subjected to predetermined signal processing including generation processing (YC processing) of brightness data and color-difference data, in the digital signal processing unit 24. The image data (YC data) subjected to YC processing is read from the digital signal processing unit 24 and stored in the memory 48 again. Subsequently, the YC data is output to a compression/decompression processing unit 26 and subjected to predetermined compression processing such as JPEG (Joint Photographic Experts Group). The compressed YC data is output to and stored in the memory 48 again, read by a media controller 52 and stored in a memory card 54.

Next, an automatic focus adjustment method in the digital camera 10 employing the configuration will be explained.

First Embodiment

Figure 3:
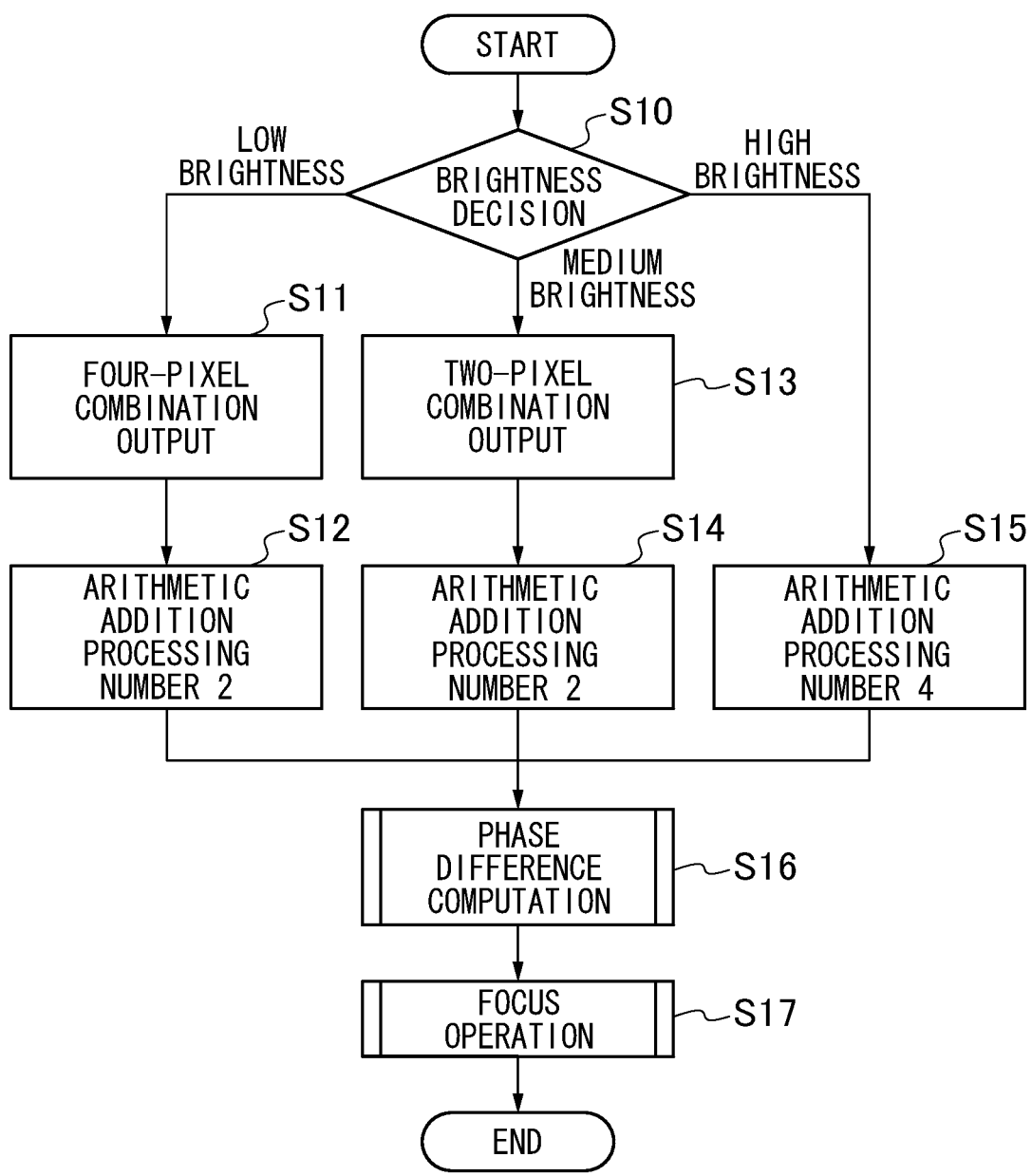
FIG. 3 is a flowchart illustrating automatic focus adjustment processing according to the first embodiment of the present invention.

The first embodiment combines pixel combination and arithmetic mean according to the brightness of a subject. FIG. 3 is a flowchart illustrating AF processing according to the first embodiment.

The CPU 40 acquires the brightness of the subject (subject brightness) based on an integration value acquired from the AE detection unit 44 and decides which of low brightness, medium brightness and high brightness this subject brightness corresponds to (step S10). For example, the CPU 40 decides the low brightness when the subject brightness is less than a first threshold, decides the medium brightness when the subject brightness is equal to or greater than the first threshold and less than a second threshold (which is a higher value than the first threshold), and decides the high brightness when the subject brightness is equal to or greater than the second threshold. For example, when the maximum output of each pixel is 16,000, it is assumed that the first threshold is 4,000 and the second threshold is 8,000. Here, the subject brightness is not limited to one acquired based on the integration value acquired from the AE detection unit 44 but may be acquired using a sensor or the like.

Figure 4A:
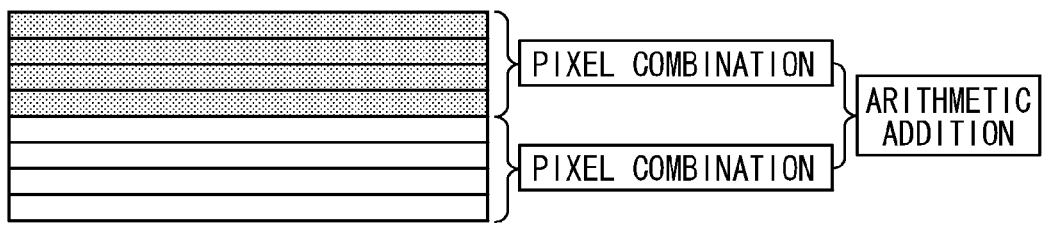
FIG. 4A is a pattern view illustrating pixel combination and arithmetic mean processing in the automatic focus adjustment processing according to the first embodiment of the present invention.

When the subject brightness is decided as the low brightness ("low brightness" in step S10), as illustrated in FIG. 4A, the imaging element control unit 32 performs four-pixel combination of the right shift pixels and the left shift pixels in the vertical direction (step S11). That is, the imaging element control unit 32 combines performs pixel combination of right shift pixels A11, A12, A13 and A14 and performs pixel combination of left shift pixels B11, B12, B13 and B14. Similarly, right shift pixels A21, A22, A23 and A24 are subjected to pixel combination, and left shift pixels B21, B22, B23 and B24 are subjected to pixel combination. This applies to all right shift pixels and left shift pixels.

The pixel combination denotes processing to combine image signals of right shift pixels and left shift pixels adjacent to each other in the vertical direction of the imaging element 16 and acquire an image signal of a higher signal level than an image signal of one pixel.

The signal charge output from each pixel includes noise. The noise is roughly classified into dark noise (which is noise by charges caused in a state where no light is given to the imaging element), fixed pattern noise (which is noise depending on dark current characteristics of silicon) and shot noise (which is noise due to a light amount). Since the signal charge output by pixel combination becomes large, an influence of the shot noise is reduced and the SN ratio is improved.

When the subject brightness is the low brightness, since it is not possible to acquire a sufficient exposure amount, the signal charge of each pixel is small and the SN ratio degrades. Therefore, the signal charge output by pixel combination is increased to improve the SN ratio. For example, when the maximum output is 16,000 and the first threshold is 4,000, it is possible to increase the upper-limit output within a range not exceeding the maximum output by four-pixel combination.

The signal charges subjected to pixel combination in step S11 are read as a voltage signal and input in the AF detection unit 42. As illustrated in FIG. 4A, the AF detection unit 42 calculates the arithmetic mean of two vertically adjacent output values with respect to the read voltage signals of right shift pixels and left shift pixels subjected to four-pixel combination in step S11 (step S12). That is, the AF detection unit 42 calculates the arithmetic mean of an output voltage signal acquired by pixel combination of right shift pixels A11, A12, A13 and A14 and an output voltage signal acquired by pixel combination of right shift pixels A15, A16, A17 and A18, the arithmetic mean of an output voltage signal acquired by pixel combination of right shift pixels A21, A22, A23 and A24 and an output voltage signal acquired by pixel combination of right shift pixels A25, A26, A27 and A28, and so on. Similarly, the arithmetic mean of voltage signals is calculated for the left shift pixels.

The arithmetic mean has an effect of causing noise to be $1/\sqrt{N}$ in a case where the arithmetic addition number is N. By performing arithmetic mean of voltage signals in which the noise is reduced by pixel combination, it is possible to further reduce noise.

Figure 4B:
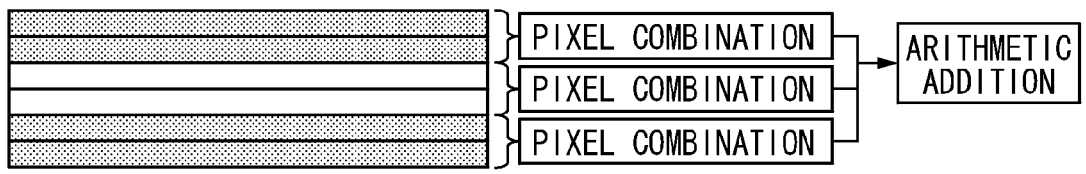
FIG. 4B is a pattern view illustrating pixel combination and arithmetic mean processing in the automatic focus adjustment processing according to the first embodiment of the present invention.

When the subject brightness is decided as the medium brightness ("medium brightness" in step S10), as illustrated in FIG. 4B, the imaging element control unit 32 performs two-pixel combination of the right shift pixels and the left shift pixels in the vertical direction (step S13). In the case of the medium brightness, the signal charge of each pixel is larger than that in the case of the low brightness. Therefore, compared to the case of the low brightness, the pixel arithmetic addition number decreases. For example, when the maximum output is 16,000 and the second threshold is 8,000, it is possible to increase the upper-limit output within a range not exceeding the maximum output by two-pixel combination.

As illustrated in FIG. 4B, the AF detection unit 42 acquires signal charges read by two-pixel combination and calculates the arithmetic mean of three vertically-adjacent voltage signals of the right shift pixels or the left shift pixels subjected to two-pixel combination and read in step S13 (step S14).

Figure 4C:
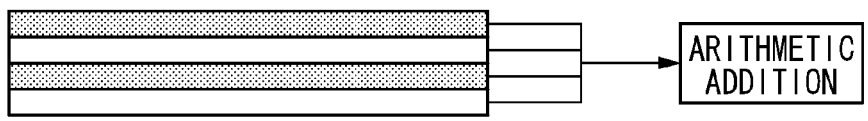
FIG. 4C is a pattern view illustrating pixel arithmetic mean processing in the automatic focus adjustment processing according to the first embodiment of the present invention.

When the subject brightness is decided as the high brightness ("high brightness" in step S10), the signal amount of each pixel has a sufficient value and therefore pixel combination is not performed. Therefore, as illustrated in FIG. 4C, voltage signals of the right shift pixels and the left shift pixels are read, and the AF detection unit 42 calculates the arithmetic mean of four vertically-adjacent read voltage signals of the right shift pixels or the left shift pixels (step S15). Thus, in a brightness area in which it is possible to acquire a sufficient exposure amount, it is possible to reduce noise by arithmetic mean.

The AF detection unit 42 performs a correlation computation of the signal charges subjected to arithmetic mean in steps S12, S14 and S15, and calculates a defocus amount from the phase difference (step S16). The CPU 40 acquires the defocus amount from the AF detection unit 42, calculates a shift amount of the focus lens of the imaging lens 12 based on this defocus amount and shifts the imaging lens 12 by the calculated shift amount via the lens drive unit 36 (step S17). By this means, automatic focus adjustment is performed.

In the present embodiment, by using both the pixel combination and the arithmetic mean, it is possible to reduce noise and improve the SN ratio, regardless of the subject brightness. Also, by separately using the pixel combination and the arithmetic mean according to the subject brightness, even when imaging any subject, it is possible to adequately reduce noise and acquire a phase difference computation result at high accuracy. Therefore, it is possible to perform an accurate automatic focus adjustment.

Also, in the present embodiment, the number of pixels subjected to pixel combination is increased as the brightness degrades. By this means, even in the case of the low brightness, it is possible to adequately reduce noise and improve the SN ratio. Therefore, even in a darker brightness area, an automatic focus adjustment is possible.

Also, in the present embodiment, since the pixel combination and the arithmetic mean calculation are performed only in the vertical direction and are not performed in the horizontal direction, it is possible to reduce noise without degrading the accuracy of AF processing.

Also, in the present embodiment, for a phase difference AF, it is possible to shorten the time required for AF processing. Also, since the same imaging element as an imaging element used for the phase difference AF in the related art is used and new hardware is not required, it is possible to perform an accurate focus adjustment at lower cost and with space-saving.

Also, in the present embodiment, although pixel combination is performed on four pixels in the case of the low brightness and two pixels in the case of the medium brightness, it is needless to say that the pixel combination number is not limited to these. Also, even in the case of the high brightness, it may be possible to perform pixel combination based on accumulated signal charges.

Figure 5:
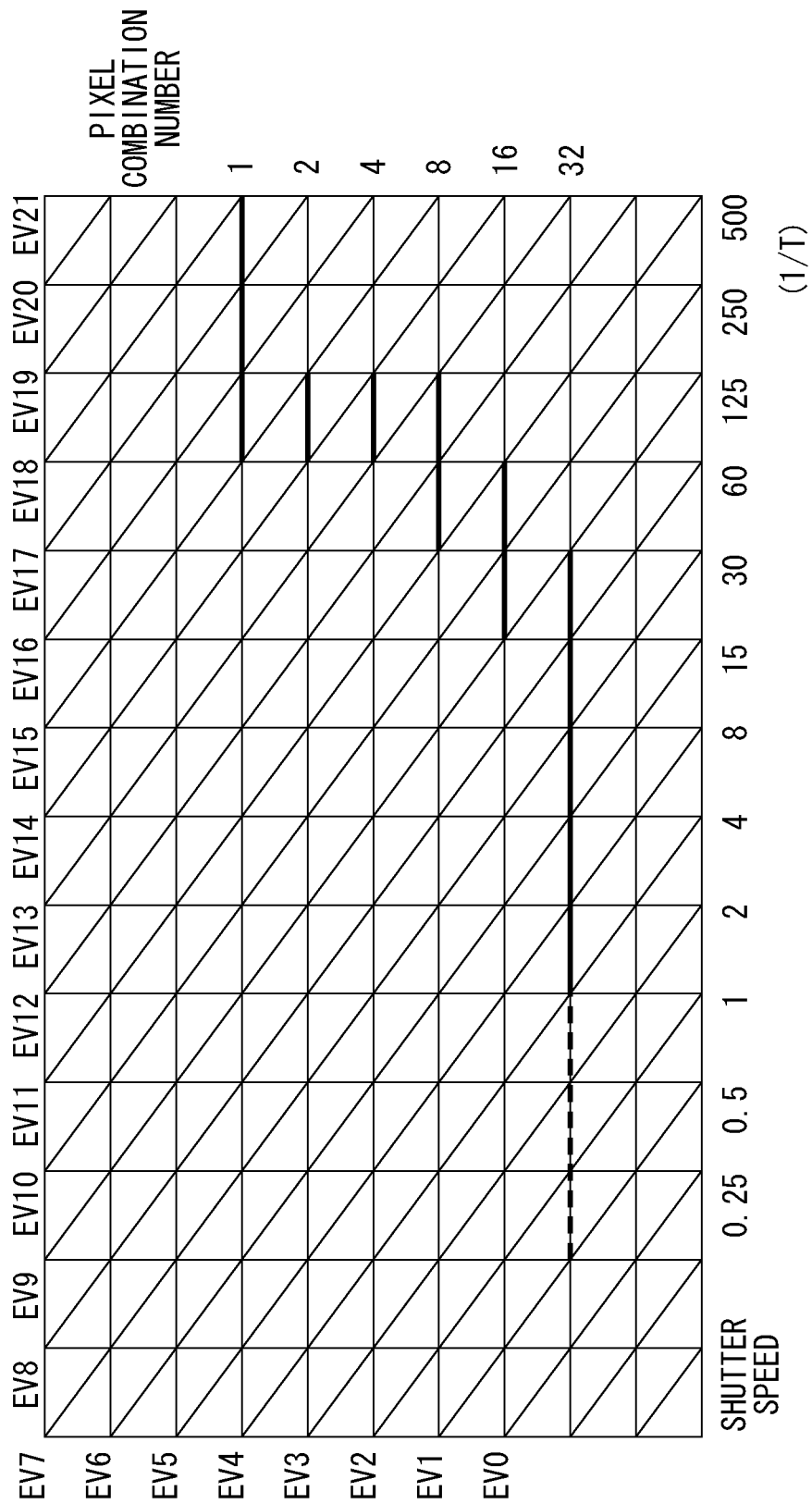
FIG. 5 is a graph illustrating relationships between an Ev value, shutter speed and pixel combination number.

Also, in the present embodiment, the pixel combination number is determined by relationships between the maximum output of each pixel and thresholds to separate the low brightness, the medium brightness and the high brightness, but the way of determining the pixel combination number is not limited to this. FIG. 5 illustrates an example of a method of changing the pixel combination number on many stages according to the Ev value or the shutter speed.

According to FIG. 5, in a case where the shutter speed is equal to or less than $1/15$ second, the pixel combination number is set to 32 regardless of the Ev value. The pixel combination number changes by the Ev value in a case where the shutter speed is between $1/15$ second to $1/60$ second, and the pixel combination number is 32 in the case of Ev8, the pixel combination number is 16 in the case of Ev9 and Ev10, the pixel combination number is 8 in the case of Ev11 and Ev12, the pixel combination number is 4 in the case of Ev13, the pixel combination number is 2 in the case of Ev14 and the pixel combination number is 1 in the case of Ev15. In a case where the shutter speed is $1/125$ second, the pixel combination number is set to 1 regardless of the Ev value. Thus, by changing the pixel combination number on many stages, it is possible to determine the pixel combination number more adequately.

Also, in the present embodiment, although the arithmetic addition number used for arithmetic mean is increased as the subject brightness becomes higher, in order to perform an accurate automatic focus adjustment in a darker brightness area, the arithmetic addition number used for arithmetic mean may be increased as the subject brightness becomes lower.

Second Embodiment

Figure 6:
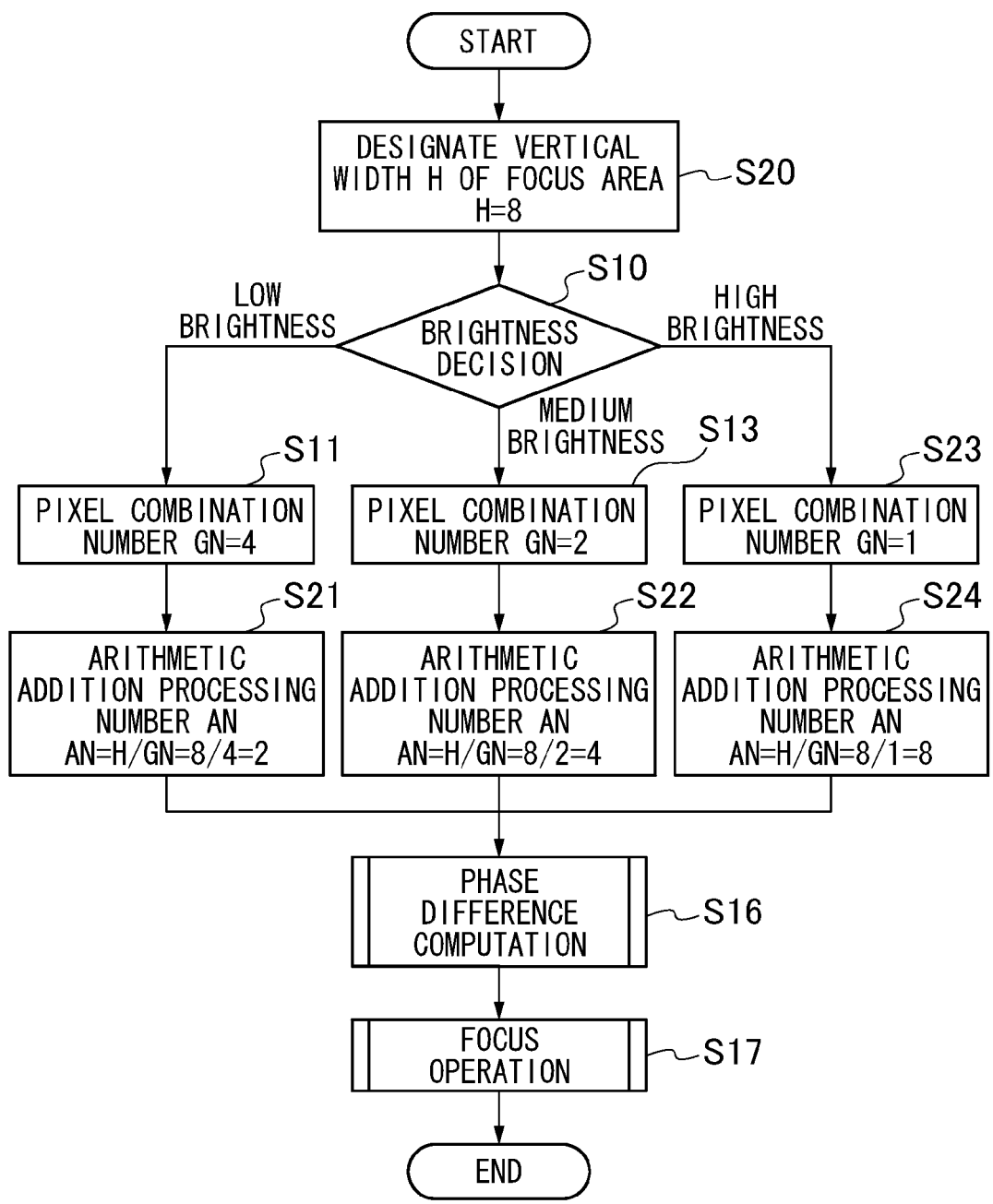
FIG. 6 is a flowchart illustrating automatic focus adjustment processing according to the second embodiment of the present invention.

The second embodiment maintains the product of the pixel number for pixel combination and the number of voltage signals used for arithmetic mean. FIG. 6 is a flowchart illustrating a flow of AF processing according to the second embodiment. Also, the same reference numerals are assigned to the same components as in the first embodiment and detailed explanation will be omitted.

The CPU 40 designates a vertical width H of the focus area, that is, the value of the product of the pixel number for pixel combination and the number of voltage signals used for arithmetic mean (step S20). In this processing, it may be designated based on an input from the operation unit 38 or a predetermined value may be always designated. In the present embodiment, "8" is designated as H.

The CPU 40 acquires the brightness of the subject (subject brightness) based on an integration value acquired from the AE detection unit 44 and decides which of low brightness, medium brightness and high brightness this subject brightness corresponds to (step S10).

Figure 7A:
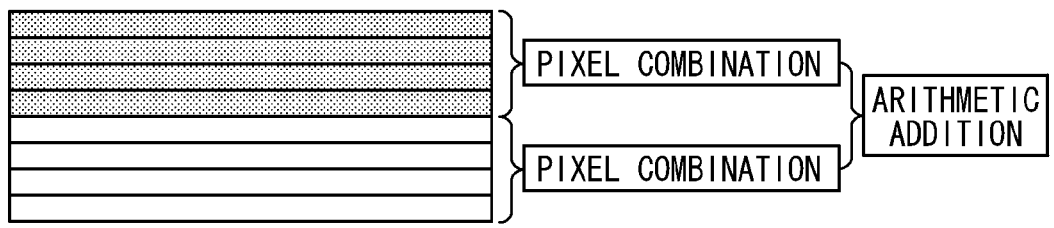
FIG. 7A is a pattern view illustrating pixel combination and arithmetic mean processing in the automatic focus adjustment processing according to the second embodiment of the present invention.

When the subject brightness is decided as the low brightness ("low brightness" in step S10), as illustrated in FIG. 7A, the imaging element control unit 32 performs four-pixel combination of the right shift pixels and the left shift pixels in the vertical direction (step S11). That is, the pixel combination number GN in step S11 is 4.

The signal charges subjected to pixel combination in step S11 are read as a voltage signal and input in the AF detection unit 42. The AF detection unit 42 determines a voltage signal number AN used to calculate an arithmetic mean based on H designated in step S20 and the pixel number for pixel combination performed in step S11, and calculates the arithmetic mean using the determined voltage signal number. In the present embodiment, since H is 8 and the pixel number for pixel combination in step S11 is 4, AN is calculated as H/GN=8/4=2. Therefore, as illustrated in FIG. 7A, the AF detection unit 42 calculates the arithmetic mean of two vertically-adjacent output values with respect to the read voltage signals of right shift pixels and left shift pixels subjected to four-pixel combination in step S11 (step S21).

Figure 7B:
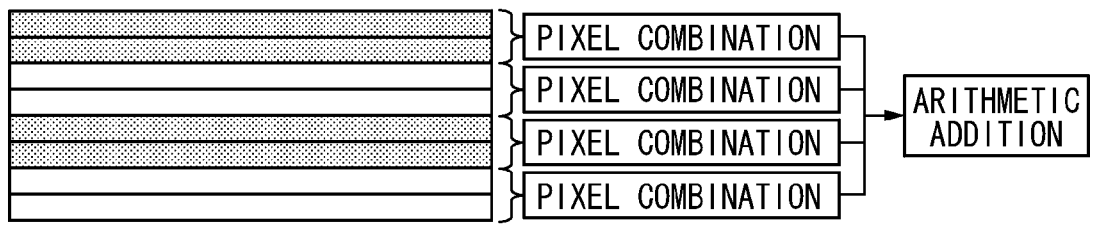
FIG. 7B is a pattern view illustrating pixel combination and arithmetic mean processing in the automatic focus adjustment processing according to the second embodiment of the present invention.

When the subject brightness is decided as the medium brightness ("medium brightness" in step S10), as illustrated in FIG. 7B, the imaging element control unit 32 performs two-pixel combination of the right shift pixels and the left shift pixels in the vertical direction (step S13). That is, the pixel combination number GN in step S13 is 2.

The signal charges subjected to pixel combination in step S13 are read as a voltage signal and input in the AF detection unit 42. The AF detection unit 42 determines a voltage signal number AN used to calculate an arithmetic mean based on H designated in step S20 and the pixel number for pixel combination performed in step S13, and calculates the arithmetic mean using the determined number. In the present embodiment, since H is 8 and the pixel number for pixel combination in step S13 is 2, AN is calculated as H/GN=8/2=4. Therefore, as illustrated in FIG. 7B, the AF detection unit 42 calculates the arithmetic mean of four vertically-adjacent output values with respect to the read voltage signals of right shift pixels and left shift pixels subjected to two-pixel combination in step S11 (step S22).

Figure 7C:
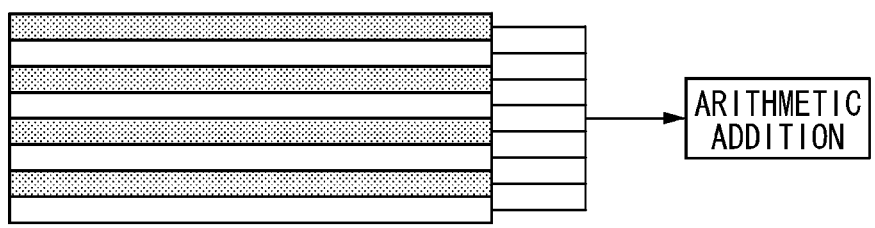
FIG. 7C is a pattern view illustrating pixel arithmetic mean processing in the automatic focus adjustment processing according to the second embodiment of the present invention.

When the subject brightness is decided as the high brightness ("high brightness" in step S10), the signal amount of each pixel has a sufficient value and therefore pixel combination is not performed. Therefore, as illustrated in FIG. 7C, voltage signals of the right shift pixels and the left shift pixels are read. That is, GN is 1 (step S23).

The AF detection unit 42 determines a voltage signal number AN used to calculate an arithmetic mean based on H designated in step S20 and the pixel number for pixel combination in step S23, and calculates the arithmetic mean using the determined number. In the present embodiment, since H is 8 and the pixel number for pixel combination in step S23 is 1, AN is calculated as H/GN=8/1=8. Therefore, as illustrated in FIG. 7C, the AF detection unit 42 calculates the arithmetic mean of eight vertically-adjacent output values with respect to the read voltage signals of right shift pixels and left shift pixels without pixel combination.

The AF detection unit 42 performs correlation computation on the signal charges subjected to arithmetic mean in steps S21, S22 and S24, and calculates a defocus amount from the phase difference (step S16). The CPU 40 acquires the defocus amount from the AF detection unit 42 and calculates a shift amount of the focus lens of the imaging lens 12 based on this defocus amount. Subsequently, the CPU 40 shifts the imaging lens 12 by the calculated shift amount via the lens drive unit 36 (step S17). By this means, automatic focus adjustment is performed.

According to the present embodiment, it is possible to maintain the product of the pixel number for pixel combination and the number of voltage signals used for arithmetic mean, that is, the pixel number based on a voltage signal calculated by the arithmetic mean, while changing the pixel combination number according to the subject brightness.

Therefore, it is possible to maintain a phase difference and the size of an area in which a defocus amount is calculated, regardless of the subject brightness. Therefore, a stable automatic focus adjustment is possible.

Third Embodiment

Figure 8A:
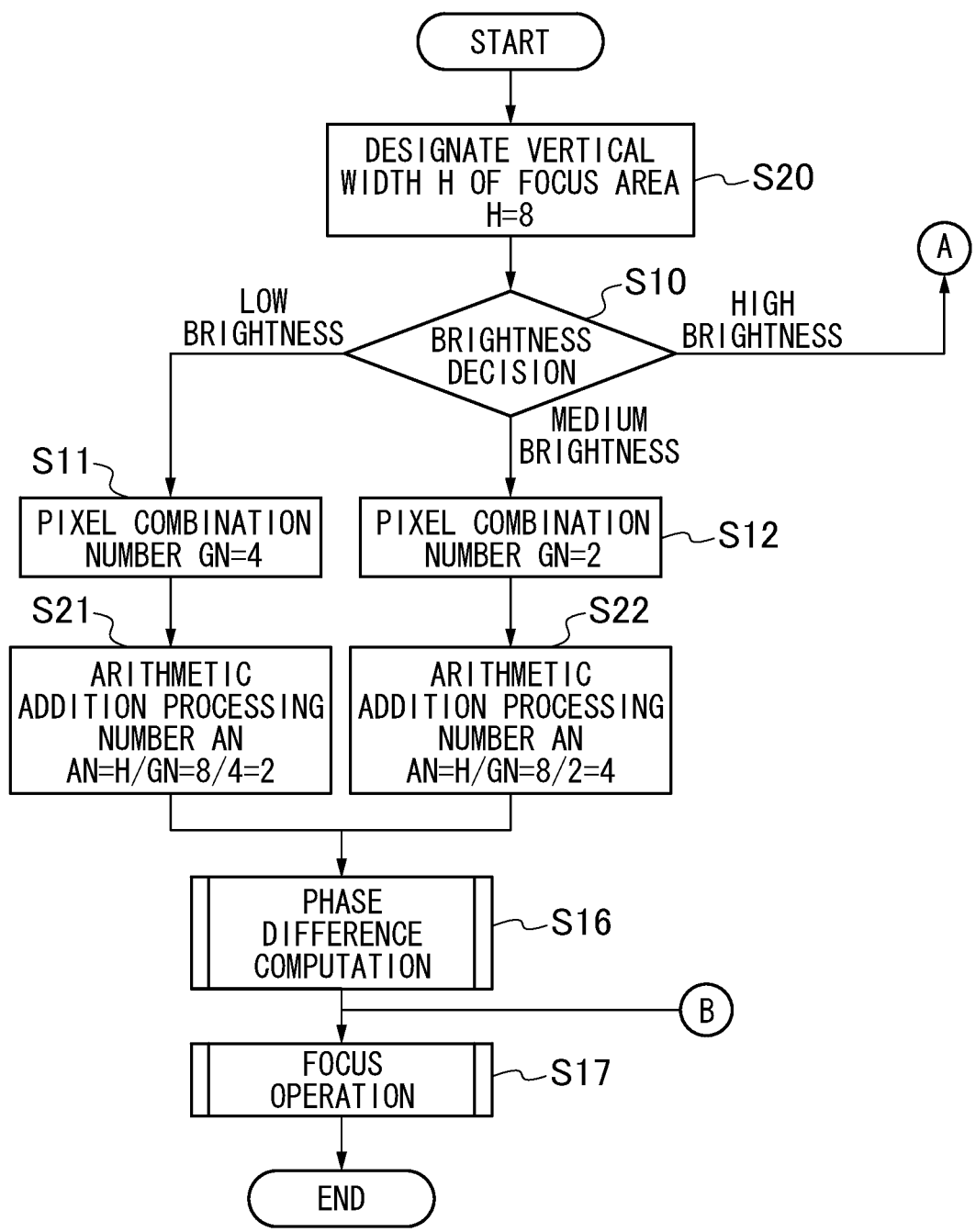
FIG. 8A is a flowchart illustrating automatic focus adjustment processing according to the third embodiment of the present invention.
Figure 8B:
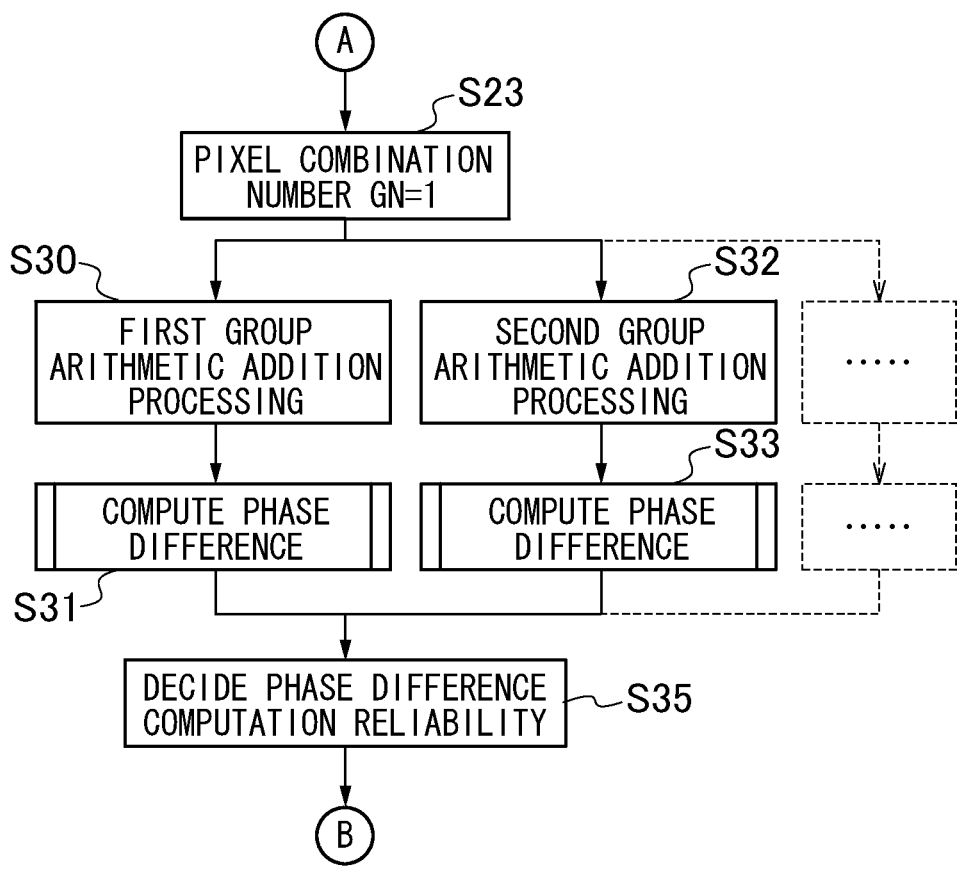
FIG. 8B is a (subsequent) flowchart illustrating the automatic focus adjustment processing according to the third embodiment of the present invention.

The third embodiment performs accurate automatic focus adjustment by dividing a focus area into a plurality of areas in the case of high brightness. FIG. 8A and FIG. 8B are flowcharts illustrating a flow of AF processing in the third embodiment. Also, the same reference numerals are assigned to the same components as in the first embodiment and the second embodiment, and detailed explanation will be omitted.

The CPU 40 designates a vertical width H (8 in the present embodiment) of the focus area, that is, the value of the product of the pixel number for pixel combination and the number of voltage signals used for arithmetic mean (step S20).

The CPU 40 acquires the brightness of the subject (subject brightness) based on an integration value acquired from the AE detection unit 44 and decides which of low brightness, medium brightness and high brightness this subject brightness corresponds to (step S10).

When the subject brightness is decided as the low brightness ("low brightness" in step S10), a pixel combination number GN is set to 4 and the imaging element control unit 32 performs four-pixel combination of the right shift pixels and the left shift pixels in the vertical direction (step S11).

The signal charges subjected to pixel combination in step S11 are read as a voltage signal and input in the AF detection unit 42. The AF detection unit 42 determines a voltage signal number AN (in the present step, AN=H/GN=8/4=2) used to calculate an arithmetic mean based on H designated in step S20 and the pixel number for pixel combination performed in step S11, and calculates the arithmetic mean of two vertically adjacent output values with respect to the read voltage signals of right shift pixels and left shift pixels subjected to four-pixel combination in step S11 (step S21).

When the subject brightness is decided as the medium brightness ("medium brightness" in step S10), the pixel combination number GN is set to 2 and the imaging element control unit 32 performs two-pixel combination of the right shift pixels and the left shift pixels in the vertical direction (step S13).

The signal charges subjected to pixel combination in step S13 are read as a voltage signal and input in the AF detection unit 42. The AF detection unit 42 determines a voltage signal number AN (in the present step, AN=H/GN=8/2=4) used to calculate an arithmetic mean based on H designated in step S20 and the pixel number for pixel combination performed in step S13, and calculates the arithmetic mean of four vertically adjacent output values with respect to the read voltage signals of right shift pixels and left shift pixels subjected to two-pixel combination in step S11 (step S22).

The AF detection unit 42 performs correlation computation on the signal charges subjected to arithmetic mean in steps S21 and S22, and calculates a defocus amount from the phase difference (step S16).

When the subject brightness is decided as the high brightness ("high brightness" in step S10), the signal amount of each pixel has a sufficient value and therefore pixel combination is not performed (GN=1) (step S23).

The AF detection unit 42 divides the focus area into a plurality of areas. Subsequently, the AF detection unit 42 calculates the arithmetic mean of voltage signals every divided area (step S30, 32, ... ), performs correlation computation on the voltage signals subjected to arithmetic mean and calculates a defocus amount from the phase difference (step S31, S33, . . . ).

Figure 9:
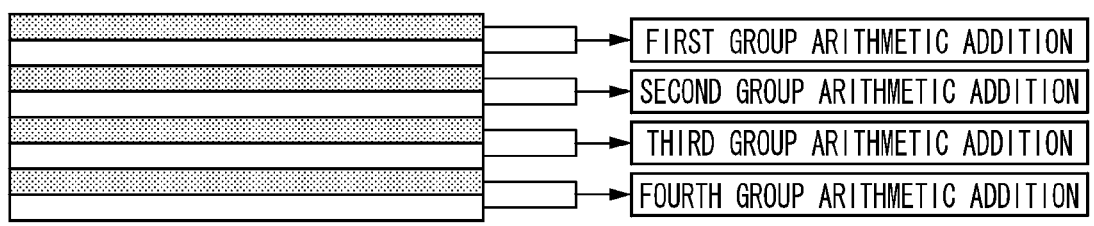
FIG. 9 is a pattern view illustrating pixel combination and arithmetic mean processing in the automatic focus adjustment processing according to the third embodiment of the present invention.

In the present embodiment, as illustrated in FIG. 9, the pixel number of phase difference pixels of a focus area is 8 pixels and is divided into four areas in the vertical direction. Therefore, the AF detection unit 42 calculates the arithmetic mean of 2-pixel vertically-adjacent voltage signals. That is, the arithmetic mean of voltage signals of right shift pixels A11 and A12 (first group) is performed (step S30) and the arithmetic mean of voltage signals of right shift pixels A13 and A14 (second group) is performed (step S32). This processing is performed on all groups. Similarly, the arithmetic mean is calculated for the left shift pixels.

A method of dividing a focus area into a plurality of areas in the AF detection unit 42 is arbitrary. For example, it may be possible to set the size of a divided area to a predetermined size (which can be arbitrarily changed) and determine the division number to provide this size. Also, it may be possible to arbitrarily determine the pixel number for arithmetic mean and divide a focus area based on this pixel number.

Subsequently, the AF detection unit 42 performs correlation computation on the first-group voltage signals calculated in step S30, calculates a defocus amount from the phase difference (step S31), performs correlation computation on the second-group voltage signals calculated in step S32 and calculates a defocus amount from the phase difference (step S33). This processing is performed on all groups. By this means, the defocus amount for each group is calculated.

The AF detection unit 42 decides the reliability of the defocus amount calculated for each group in steps S31, S33, . . . , and determines the most reliable defocus amount (step S35). For example, the reliability may be decided based on how it is close to the average value of the defocus amounts calculated for the groups, and the defocus amount closest to the average value may be decided as the most reliable defocus amount. Also, the reliability may be decided based on how many times the number of defocus amounts calculated for each group is included in all defocus amounts, and the defocus amount that is included most times may be decided as the most reliable defocus amount. Thus, a plurality of methods are possible to determine the most reliable defocus amount, it is arbitrary which method is adopted.

The CPU 40 acquires the defocus amount calculated and determined in steps S16 and S35, from the AF detection unit 42. The CPU 40 calculates a shift amount of the focus lens of the imaging lens 12 based on this defocus amount and shifts the imaging lens 12 by the calculated shift amount via the lens drive unit 36 (step S17). By this means, automatic focus adjustment is performed.

According to the present embodiment, in a case where the subject brightness is the high brightness, by dividing a focus area into a plurality of areas, performing a specific phase difference computation and using the most reliable computation result, it is possible to perform automatic focus adjustment more accurately.

Figure 10A:
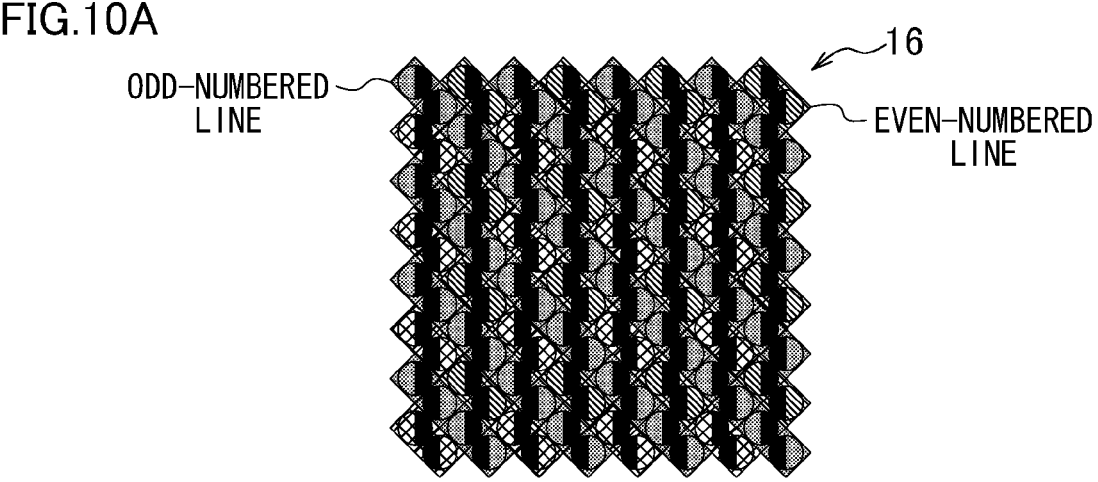
FIG. 10A is a plan view illustrating a configuration example of a phase difference CCD.
Figure 10B:
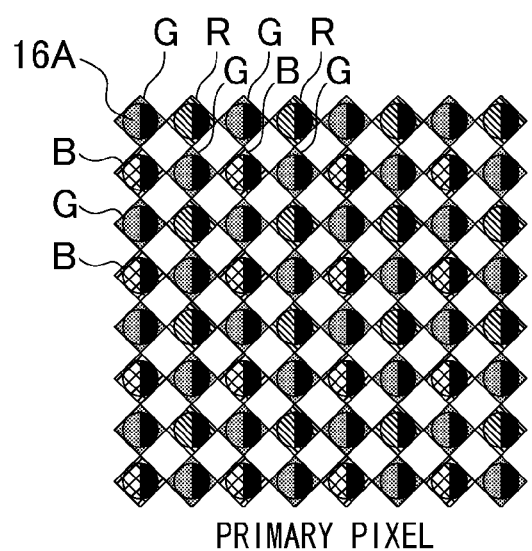
FIG. 10B is a plan view illustrating a primary pixel of the phase difference CCD.
Figure 10C:
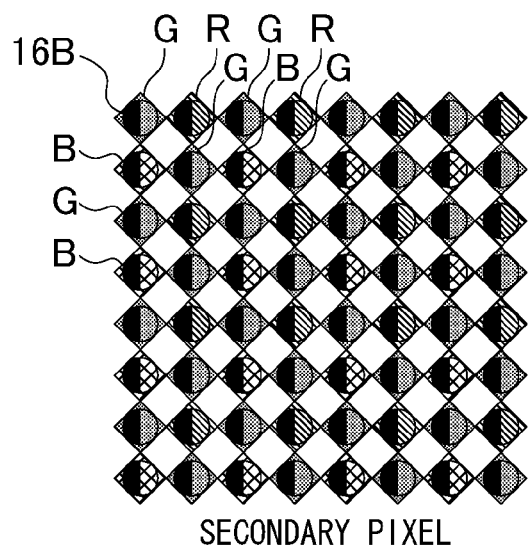
FIG. 10C is a plan view illustrating a secondary pixel of the phase difference CCD.

According to the present invention, although an imaging element in which a phase difference pixel is arranged in a focus area is used, a used imaging element is not limited to this. For example, a phase difference CCD in which all pixels are formed with phase difference pixels may be used. FIG. 10A to FIG. 10C are views illustrating a configuration example of a phase difference CCD.

As illustrated in FIG. 10A, the phase CCD includes odd-numbered line pixels (primary pixels) and even-numbered line pixels (secondary pixels) arranged in a matrix manner, and image signals of two surfaces subjected to photoelectric conversion by these primary and secondary pixels can be independently read.

As illustrated in FIG. 10B, among pixels having color filters of R (Red), G (Green) and B (Blue), the pixel alignment line of GRGR . . . and the pixel alignment line of BGBG . . . are alternately arranged in the odd-numbered lines (1, 3, 5, . . . ) in the phase difference CCD 16, while, as illustrated in FIG. 10C, similar to the odd-numbered lines, the pixel alignment line of GRGR . . . and the pixel alignment line of BGBG . . . are alternately arranged in the even-numbered line (2, 4, 6, . . . ) pixels, where the pixels of the even-numbered lines are shifted each other by half pitch in the line direction.

On the front surface side (micro lens L side) of the primary pixels of the phase difference CCD 16, a light shielding member 16A to shield light on the right half of a light receiving surface of the primary pixels (photodiode PD) is arranged, and, on the front surface side of the secondary pixels, a light shielding member 16B to shield light on the left half of a light receiving surface of the secondary pixels (photodiode PD) is arranged. Therefore, in the primary pixels, light is received only on the left side of the light axis of the light flux passing an exit pupil, and, in the secondary pixels, light is received only on the right side of the light axis of the light flux passing the exit pupil.

By using such a phase difference CCD, generating left-view image data based on image signals output from primary pixels and generating right-view image data based on image signals output from secondary pixels, it is possible to image a stereoscopic view image. Also, by using the central area of the phase difference CCD as a focus area and using the primary pixels as the left shift pixels and the secondary pixels as the right shift pixels among G pixels in the focus area, it is possible to perform automatic focus adjustment by the same method as in the present embodiment.

In the present invention, although an explanation has been given with an example of using a CCD as an imaging element, it is not limited to the CCD. The present invention is also applicable to other image sensors such as a CMOS.

REFERENCE SIGNS LIST

10: digital camera; 12 . . . imaging lens; 14 . . . diaphragm; 16 . . . imaging element; 24 . . . digital signal processing unit; 32 . . . imaging element control unit; 34 . . . diaphragm drive unit; 36 . . . lens drive unit; 38 . . . operation unit; 40 . . . CPU; 42 . . . AF detection unit; 44 . . . AE detection unit; 48 . . . memory

What is claimed is:

1. An imaging device comprising:
   an imaging optical system;
   an imaging element in which a plurality of pixels including a first pixel and a second pixel are arranged in a two-dimensional manner, the first pixel receiving a light on a partial area biased to a predetermined direction from a light axis of a light flux passing an exit pupil of the imaging optical system, the first pixel arranged at interval of a predetermined number of pixels, and the second pixel arranged so as to be adjacent to the first pixel and receiving a light on a partial area biased to an opposite direction to the predetermined direction from the light axis of the light flux passing the exit pupil of the imaging optical system;
   a brightness acquisition unit configured to acquire a brightness of a subject;
   an imaging element drive unit configured to read signal charges from the plurality of pixels as a voltage signal, the imaging element drive unit configured to read and combine signal charges of a first number of adjacent first pixels and to read and combine signal charges of the first number of adjacent second pixels when reading signal charges from the first pixel and the second pixel;

an arithmetic mean calculation unit configured to calculate an arithmetic mean of voltage signals, combined and read by the imaging element drive unit, of a second number of adjacent first pixels and to calculate an arithmetic mean of voltage signals, combined and read by the imaging element drive unit, of the second number of adjacent second pixels;

an automatic focus adjustment unit configured to detect a phase difference between the arithmetic mean of the voltage signals of the second number of the adjacent first pixels and the arithmetic mean of the voltage signals of the second number of the adjacent second pixels, and to automatically perform a focus adjustment of the imaging optical system based on the phase difference; and a processing unit configured to increase the first number and decrease the second number as the brightness of the subject acquired by the brightness acquisition unit becomes lower.

2. The imaging device according to claim 1, wherein the processing unit determines the first number and the second number such that a product of the first number and the second number is constant.

3. The imaging device according to claim 1, wherein:
the imaging element drive unit combines the first number of signal charges adjacent in a vertical direction; and
the arithmetic mean calculation unit calculates an arithmetic mean of the second number of voltage signals adjacent in a vertical direction.

4. The imaging device according to claim 1, wherein the processing unit sets the first number to 1 when the acquired brightness of the subject is equal to or greater than a predetermined brightness.

5. The imaging device according to claim 1, further comprising
an area division unit configured to divide the imaging element into a plurality of areas when the acquired brightness of the subject is higher than a predetermined threshold, wherein:
the arithmetic mean calculation unit calculates an arithmetic mean of the voltage signals for each of the divided areas; and
the automatic focus adjustment unit detects a phase difference between the first-pixel voltage signal and the second-pixel voltage signal for each of the areas based on the calculated arithmetic mean of the voltage signals for each of the areas, and automatically performs a focus adjustment of the imaging optical system based on a most reliable phase difference among the phase differences detected in the areas.

6. The imaging device according to claim 1, wherein the first pixel and second pixel are only arranged on a pixel having a green color filter.

7. The imaging device according to claim 1, wherein the first pixel and second pixel are only arranged in a focus area on the light receiving surface.

8. An imaging device comprising:
an imaging optical system;
an imaging element in which a plurality of pixels including a first pixel and a second pixel are arranged in a two-dimensional manner, the first pixel receiving a light on a partial area biased to a predetermined direction from a light axis of a light flux passing an exit pupil of the imaging optical system, the second pixel arranged so as to be adjacent to the first pixel and receiving a light on a partial area biased to an opposite direction to the predetermined direction from the light axis of the light flux passing the exit pupil of the imaging optical system;

a brightness acquisition unit configured to acquire a brightness of a subject;

an imaging element drive unit configured to read pixel signals from the plurality of pixels, the imaging element drive unit configured to combine pixel signals of a first number of adjacent first pixels to read a first pixel signal and combine pixel signals of the first number of adjacent second pixels to read a second pixel signal when reading pixel signals from the first pixel and the second pixel;

an arithmetic mean calculation unit configured to calculate an arithmetic mean of first pixel signals, combined and read by the imaging element drive unit, of a second number of adjacent first pixel signals and to calculate an arithmetic mean of second pixel signals, combined and read by the imaging element drive unit, of the second number of adjacent second pixel signals;

an automatic focus adjustment unit configured to detect a phase difference between the arithmetic mean of the first pixel signals of the second number of the adjacent first pixel signals and the arithmetic mean of the second pixel signals of the second number of the adjacent second pixel signals, and to automatically perform a focus adjustment of the imaging optical system based on the phase difference; and a processing unit configured to increase the first number and decrease the second number as the brightness of the subject acquired by the brightness acquisition unit becomes lower.

9. The imaging device according to claim 8, wherein the processing unit determines the first number and the second number such that a product of the first number and the second number is constant.

10. The imaging device according to claim 8, wherein:
the imaging element drive unit combines the first number of pixel signals adjacent in a vertical direction; and
the arithmetic mean calculation unit calculates an arithmetic mean of the second number of pixel signals adjacent in a vertical direction.

11. The imaging device according to claim 8, wherein the processing unit sets the first number to 1 when the acquired brightness of the subject is equal to or greater than a predetermined brightness.

12. The imaging device according to claim 8, further comprising
an area division unit configured to divide the imaging element into a plurality of areas when the acquired brightness of the subject is higher than a predetermined threshold, wherein:
the arithmetic mean calculation unit calculates an arithmetic mean of the pixel signals for each of the divided areas; and
the automatic focus adjustment unit detects a phase difference between the first pixel signal and the second pixel signal for each of the areas based on the calculated arithmetic mean of the pixel signals for each of the areas, and automatically performs a focus adjustment of the imaging optical system based on a most reliable phase difference among the phase differences detected in the areas.

13. The imaging device according to claim 8, wherein the first pixel and second pixel are only arranged on a pixel having a green color filter.

14. The imaging device according to claim 8, wherein the first pixel and second pixel are only arranged in an focus area on the light receiving surface.

* * * * *